(12) United States Patent
Yamada

(10) Patent No.: US 7,359,071 B2
(45) Date of Patent: Apr. 15, 2008

(54) IMAGE DATA PROCESSING DEVICE

(75) Inventor: Akihiro Yamada, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 785 days.

(21) Appl. No.: 10/808,449

(22) Filed: Mar. 25, 2004

(65) Prior Publication Data

US 2004/0190012 A1     Sep. 30, 2004

(30) Foreign Application Priority Data

Mar. 28, 2003   (JP) .............................. 2003-092243

(51) Int. Cl.
*H04N 1/40* (2006.01)
(52) U.S. Cl. ...................... 358/1.13; 358/1.2
(58) Field of Classification Search ................. 358/1.2, 358/1.13, 1.9, 2.1, 3.07; 382/298–300
See application file for complete search history.

(56) References Cited

U.S. PATENT DOCUMENTS

| | | | |
|---|---|---|---|
| 5,465,165 A * | 11/1995 | Tanio et al. ................ | 358/448 |
| 5,970,216 A * | 10/1999 | Tanio et al. ................ | 358/1.13 |
| 6,621,588 B1 | 9/2003 | Shimada | |
| 6,636,324 B2 * | 10/2003 | Yamamoto .................. | 358/1.13 |
| 7,016,066 B2 * | 3/2006 | Otake ......................... | 358/1.15 |
| 7,119,913 B2 * | 10/2006 | Shibao ........................ | 358/1.13 |

FOREIGN PATENT DOCUMENTS

| | | |
|---|---|---|
| JP | A 8-286861 | 11/1996 |
| JP | A 9-261457 | 10/1997 |
| JP | A 2001-270164 | 10/2001 |
| JP | A 2002-127510 | 5/2002 |
| JP | A 2002-152506 | 5/2002 |

\* cited by examiner

*Primary Examiner*—Thomas D. Lee
*Assistant Examiner*—Stephen Brinich
(74) *Attorney, Agent, or Firm*—Oliff & Berridge, PLC

(57) ABSTRACT

An interpreter portion obtains page description language data that includes image data of an image source and image-size specifying data of both the image source and a device image. The interpreter portion generates intermediate data based on the image data of the image source and the image-size specifying data. If the image-size specifying data specifies enlargement from the image source to the device image, the interpreter portion generates the intermediate data that includes intermediate image data that is the same data as the image source data and enlargement ratio data. A rasterize portion generates print data in an output memory based on the intermediate data.

15 Claims, 10 Drawing Sheets

FIG.5(a)

EXAMPLE OF PDL DESCRIPTION
(DATA ACTUALLY SENT IS BINARY DATA)

Point_SI(xy:600 400) → POSITION OF DEVICE IMAGE
SetCursor

IMAGE SPECIFYING SECTION:
- ColorSpace_UB(1) → COLOR SPECIFICATION RGB
- SetColorSpace
  - ColorMapping_UB(0) → DIRECT IMAGE (AS OPPOSED TO PALETTE IMAGE)
  - ColorDepth_UB(2) → 8-BIT COLOR FOR EACH OF RGB (24-BIT COLOR)
  - SourceWidth_UI(100)  ⎤
  - SourceHeight_UI(50)  ⎦ → IMAGE SOURCE SIZE (100 WIDE BY 50 HIGH)
  - DestinationSize_UI(xy:500 300) → DEVICE IMAGE SIZE (500 WIDE BY 300 HIGH)
- BeginImage
  - StartLine_UI(0)
  - BlockHeight_UI(1)
  - CompressMode_UB(0) → NO COMPRESS
- ReadImage
  - DataLength((24/8)*100*50) → IMAGE DATA LENGTH (3 BYTES * 100 WIDE * 50 HIGH)
  - 32 4B 64 7D 96 AF C8 E1······ → IMAGE DATA (IMAGE SOURCE)

FIG.5(b)

PALETTE SPECIFYING SECTION:
- ColorSpace_UB(2) → COLOR SPECIFICATION RGB
- ColorMapping_UB(1) → PALETTE IMAGE
- PaletteDepth_UB(2) → PALETTE DATA IS 8 BITS
- PaletteData_UB(1 : 255 205 220) ⎫
- PaletteData_UB(2 : 225 105 210) ⎬ → PALETTE DATA
- ⋮
- PaletteData_UB(255 : 25 5 230) ⎭

FIG.5(c)

CLIP COMMAND:
- BoundingBox_UI(box:800 300 1300 550)
- setClipRectangle

FIG.7(a)

| | dotvalue | | Sn | Dn |
|---|---|---|---|---|
| (Line 1) | dotvalue = D | | 0 | 0 |
| (Line 2) | dotvalue = dotvalue − S | | 0 | 1 |
| (Line 3) | dotvalue = dotvalue − S | dotvalue = dotvalue + D | 1 | 2 |
| (Line 4) | dotvalue = dotvalue − S | | 1 | 3 |
| (Line 5) | dotvalue = dotvalue − S | dotvalue = dotvalue + D | 2 | 4 |
| (Line 6) | dotvalue = dotvalue − S | | 2 | 5 |
| (Line 7) | dotvalue = dotvalue − S | dotvalue = dotvalue + D | 3 | 6 |
| ... | ... | ... | ... | ... |

FIG.7(b)

| | dotvalue | | Sn | Dn |
|---|---|---|---|---|
| (Line 1) | 80 | | 0 | 0 |
| (Line 2) | 43 | | 0 | 1 |
| (Line 3) | 6 | 86 | 1 | 2 |
| (Line 4) | 49 | | 1 | 3 |
| (Line 5) | 12 | 92 | 2 | 4 |
| (Line 6) | 55 | | 2 | 5 |
| (Line 7) | 18 | 98 | 3 | 6 |
| (Line 8) | 61 | | 3 | 7 |
| (Line 9) | 24 | 104 | 4 | 8 |
| (Line 10) | 67 | | 4 | 9 |
| (Line 11) | 30 | 110 | 5 | 10 |
| (Line 12) | 73 | | 5 | 11 |
| (Line 13) | 36 | 116 | 6 | 12 |
| (Line 14) | 79 | | 6 | 13 |
| (Line 15) | 42 | | 6 | 14 |
| (Line 16) | 5 | 85 | 7 | 15 |
| (Line 17) | 48 | | 7 | 16 |
| (Line 18) | 11 | 91 | 8 | 17 |
| (Line 19) | 54 | | 8 | 18 |
| ... | ... | ... | ... | ... |

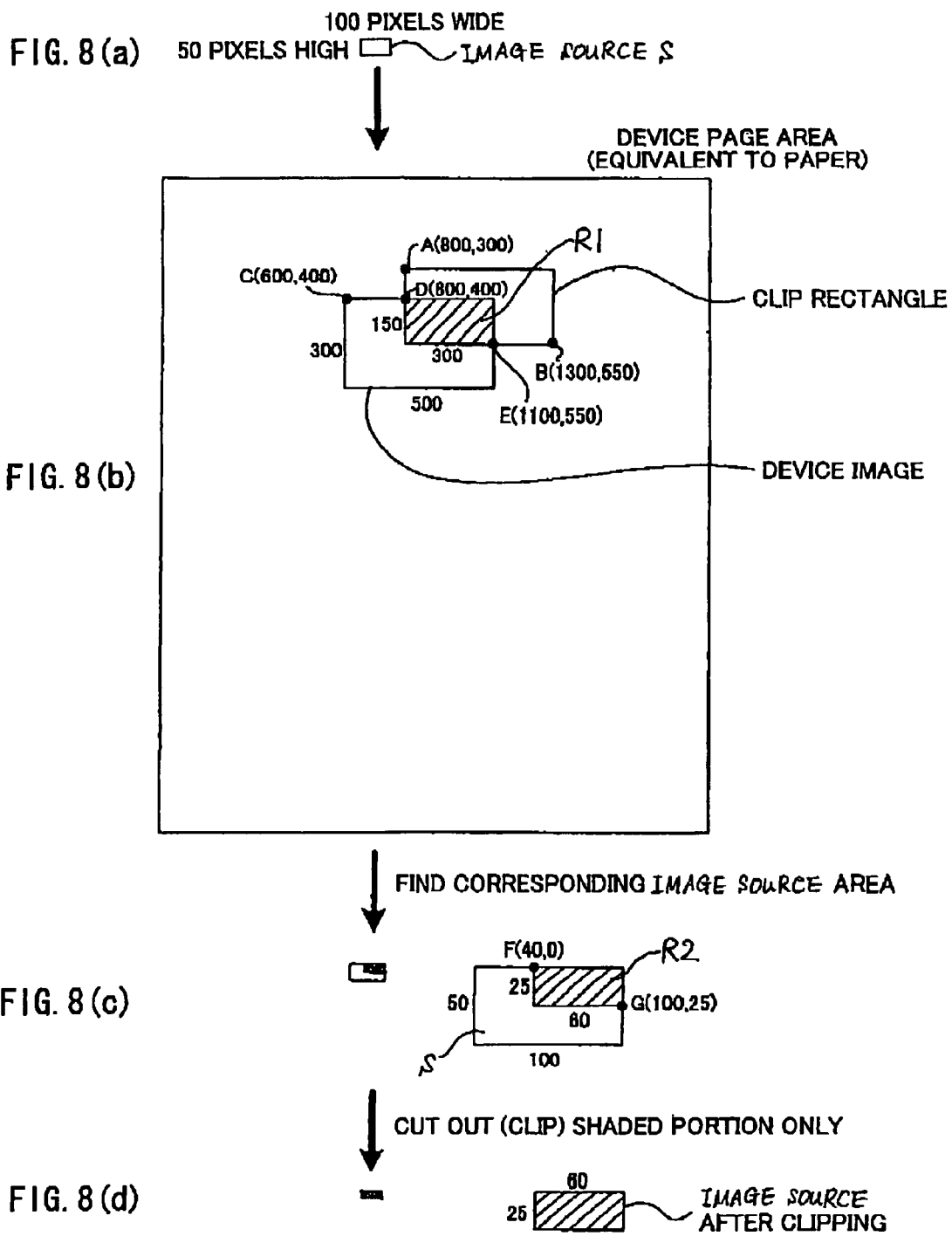

IMAGE DATA PROCESSING DEVICE

BACKGROUND OF THE INVENTION

1. Field of the Invention

The present invention relates to an image data processing device and, more particularly, to an image data processing device that reduces the amount of intermediate data used for generating print data from page description language data.

2. Description of Related Art

It is known in the art to perform processing to generate intermediate data (interim coding) and to store, in memory, the intermediate data during the expansion into print data (bitmap data) from page description language (PDL) data that has been received from a device such as a personal computer (PC).

During this process, it is highly likely that the memory will become full, particularly if there is a large amount of intermediate data. For that reason, techniques are known in the art for reducing an amount of the intermediate data, as disclosed in Japanese patent-application publication (kokai) No. 2001-270164.

SUMMARY OF THE INVENTION

However, a method disclosed in Japanese patent-application publication (kokai) No. 2001-270164 subjects part of the data to enlargement processing during the generation of the intermediate data. Accordingly, the reduction in an amount of the intermediate data cannot be performed sufficiently.

In view of the above-described drawbacks, it is an objective of the present invention to provide an image data processing device and an image forming apparatus that can reduce the intermediate data to suppress any inflation of the intermediate data and suppress pressure on the memory.

In order to attain the above and other objects, the present invention provides an image data processing device. The image data processing device includes an interpreter portion and a rasterize portion. The interpreter portion obtains page description language data that includes image data of a source image and image-size specifying data of both the source image and a device image. The interpreter portion generates intermediate data based on the image data of the source image and the image-size specifying data. The rasterize portion generates image data of the device image in an output memory based On the intermediate data. If the image-size specifying data specifies enlargement from the size of the source image to the size of the device image, the interpreter portion generates the intermediate data that includes intermediate image data and enlargement ratio data. The intermediate image data is the same data as the image data of the source image. The enlargement ratio data specifies enlargement ratios from the size of the source image to the size of the device image.

The present invention also provides an image forming apparatus. The image forming apparatus includes an image data processing device and a printing device. The image data processing device includes an interpreter portion and a rasterize portion. The interpreter portion obtains page description language data that includes image data of a source image and image-size specifying data of both the source image and a device image. The interpreter portion generates intermediate data based an the image data of the source image and the image-size specifying data. The rasterize portion generates image data of the device image in an output memory based on the intermediate data. If the image-size specifying data specifies enlargement from the size of the source image to the size of the device image, the interpreter portion generates the intermediate data that includes intermediate image data and enlargement ratio data. The intermediate image data is the same data as the image data of the source image. The enlargement ratio data specifies enlargement ratios from the size of the source image to the size of the device image. The printing device prints, on a medium, the device image in accordance with the image data of the device image.

BRIEF DESCRIPTION OF THE DRAWINGS

The above and other objects, features and advantages of the invention will become more apparent from reading the following description of the preferred embodiments taken in connection with the accompanying drawings in which:

FIG. 5(a) is an explanatory diagram of an example of PDL data and specifically showing an image specifying section;

FIG. 5(b) is an explanatory diagram of an example of PDL data and specifically showing a palette specifying section;

FIG. 5(c) is an explanatory diagram of an example of PDL data and specifically showing a clip command;

FIG. 7(a) is an explanatory diagram showing a general procedure to obtain an expansion multiplier array when expanding an image source size to a device image size;

FIG. 7(b) is an explanatory diagram showing a specific example of the procedure shown in FIG. 7(a);

FIG. 8(a) is an explanatory diagram of an image source in clip processing;

FIG. 8(b) is an explanatory diagram showing a device image and a clip rectangle in a device page area;

FIG. 8(c) is an explanatory diagram showing a corresponding area of the image source that corresponds to a clipped area of the device image;

FIG. 8(d) is an explanatory diagram showing the image source after clipping;

DETAILED DESCRIPTION OF THE PREFERRED EMBODIMENTS

An image data processing device according to a preferred embodiment of the present invention will be described while referring to the accompanying drawings.

Figure 1:
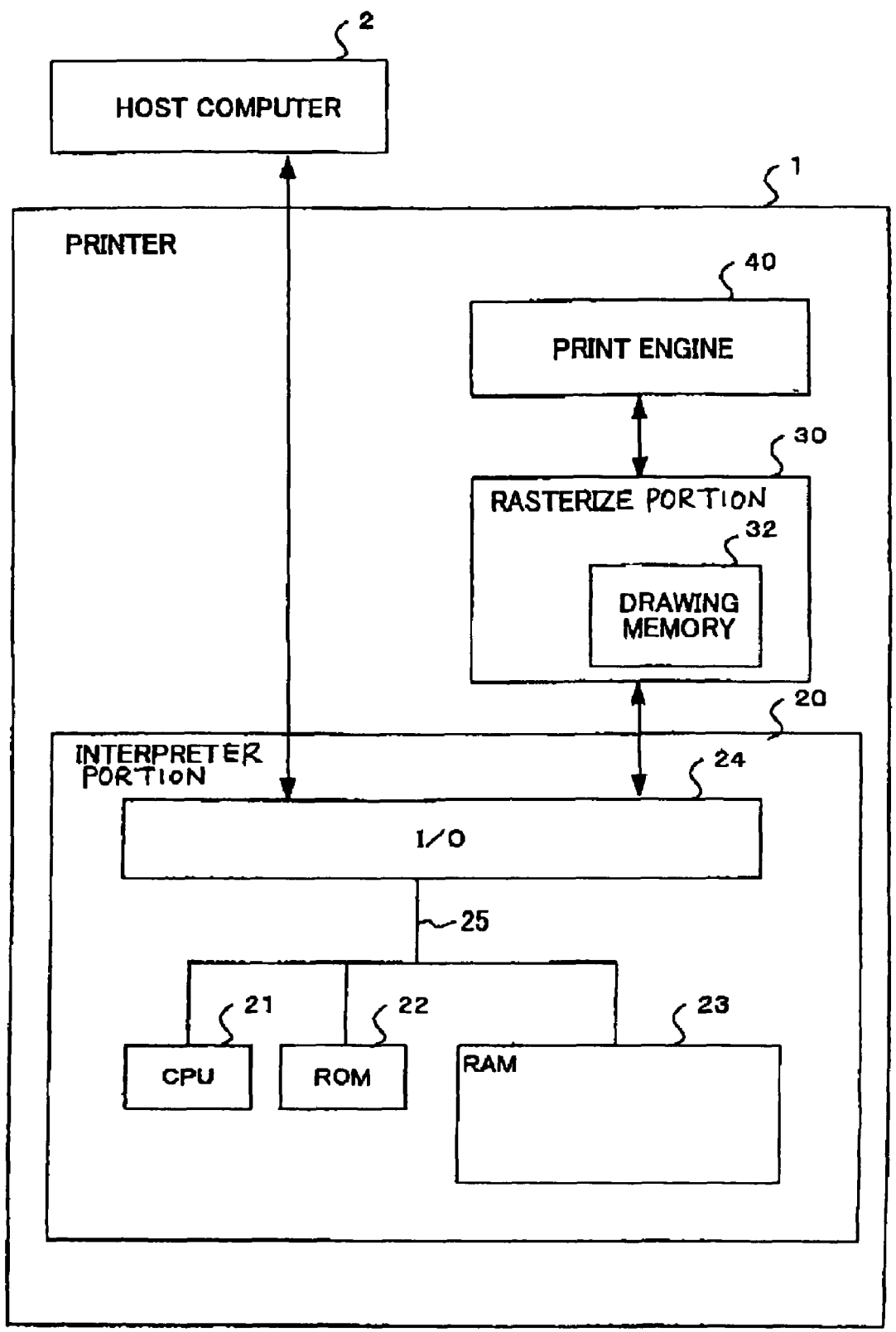
FIG. 1 is a block diagram of the configuration of a print system provided with a host computer and a printer according to an embodiment of the present invention.

FIG. 1 shows a configuration of a print system that is provided with a printer 1 and a host computer 2 that is connected to the printer 1.

The host computer 2 is an ordinary personal computer that is connected to the printer 1. The host computer 2 has printer driver software and application software installed therein. The application software creates drawing data. The printer driver software operates in accordance with a print request from the application software to convert the drawing data into page description language (PDL) data that can be interpreted by the printer 1. The host computer 2 then sends the PDL data to the printer 1.

The printer 1 is provided with an interpreter portion 20, a rasterize portion 30, and a print engine 40.

The interpreter portion 20 is configured of a computer system provided with a CPU 21, ROM 22, RAM 23, an input-output device (I/O) 24, and a bus line 25 connecting together these components. The CPU 21 receives the PDL data from the host computer 2 by operating a program stored in the ROM 22, subjects it to processes shown as Steps S10 through S30 in FIG. 2 (Step is hereinafter referred to as "S"), such as an enlargement/reduction processing (S10), a rotation processing (S20), and an intermediate data storing processing (S30), then generates intermediate data (to be described later) for output to the rasterize portion 30.

The rasterize portion 30 is configured of an application-specific integrated circuit (ASIC), for example, and is provided with a drawing memory 32. The rasterize portion 30 performs processing such as that shown as S40 through S60 in FIG. 2. In other words, it acquires the intermediate data from the RAM 23 of the interpreter portion 20 through the I/O 24, then generates device multivalued page data into the drawing memory 32, based on the intermediate data (S40). Then, the page data in the drawing memory 32 is subjected to UCRGCR (under color removal and gray component replacement) processing to adjust the black level thereof (S50). The page data is subsequently binarized through half-tone processing according to well-known dither method (S60). The rasterize portion 30 outputs video data to the print engine 40, based on the data processed by the above-described method.

The print engine 40 is a laser printer engine. The print engine 40 inputs the video data that has been output from the rasterize portion 30 and prints images onto paper.

Figure 3:
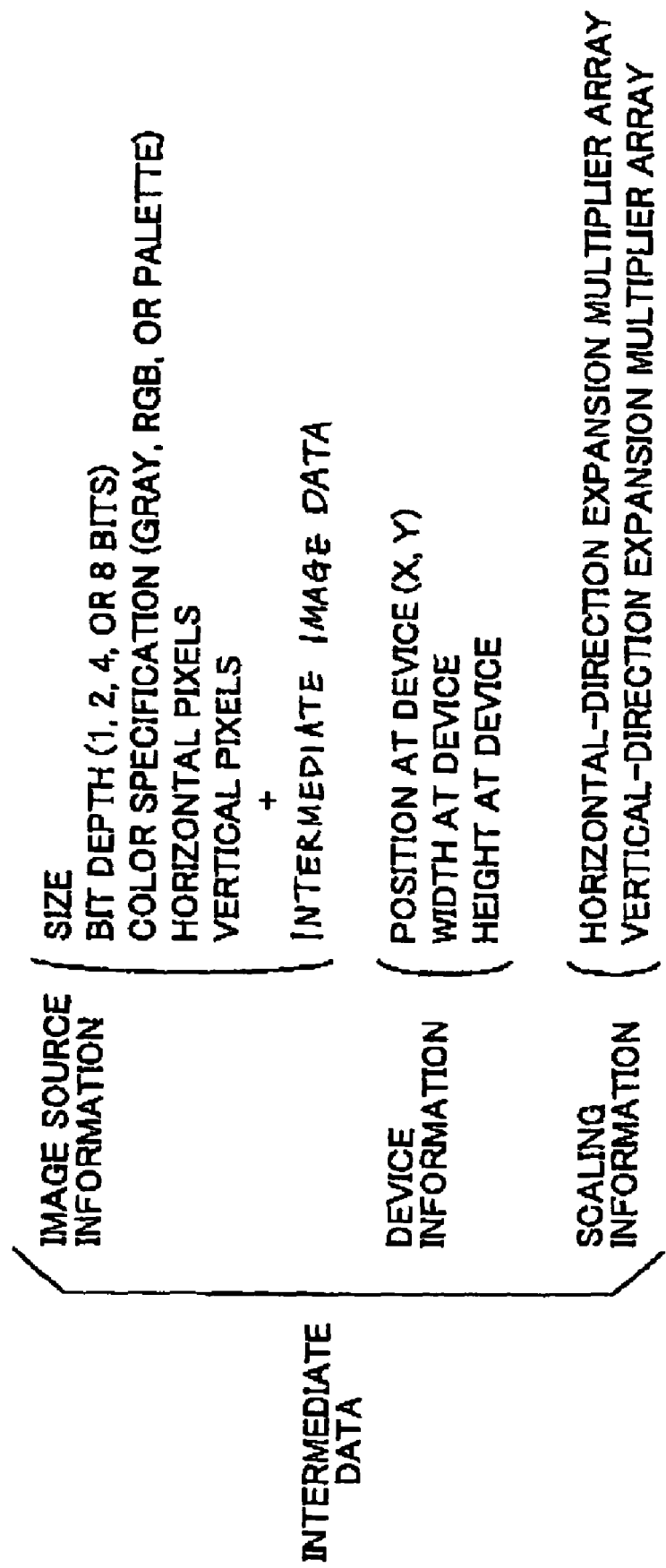
FIG. 3 is an explanatory diagram of data structure of intermediate data.

FIG. 3 shows data structure of intermediate data. The intermediate data is configured of image source information, device information, and scaling information. The image source information includes data such as size (number of bytes of image source information), bit depth, color specification, a number of pixels in a horizontal direction (widthwise direction), a number of pixels in a vertical direction (heightwise direction), and image data used as intermediate data (image data after enlargement or reduction) or intermediate image data. The device information includes data such as position at the device (x, y), width at the device, and height at the device. The scaling information includes a vertical-direction and a horizontal-direction expansion multiplier array.

The processing in the interpreter portion 20 is described below in more detail.

Figure 4:
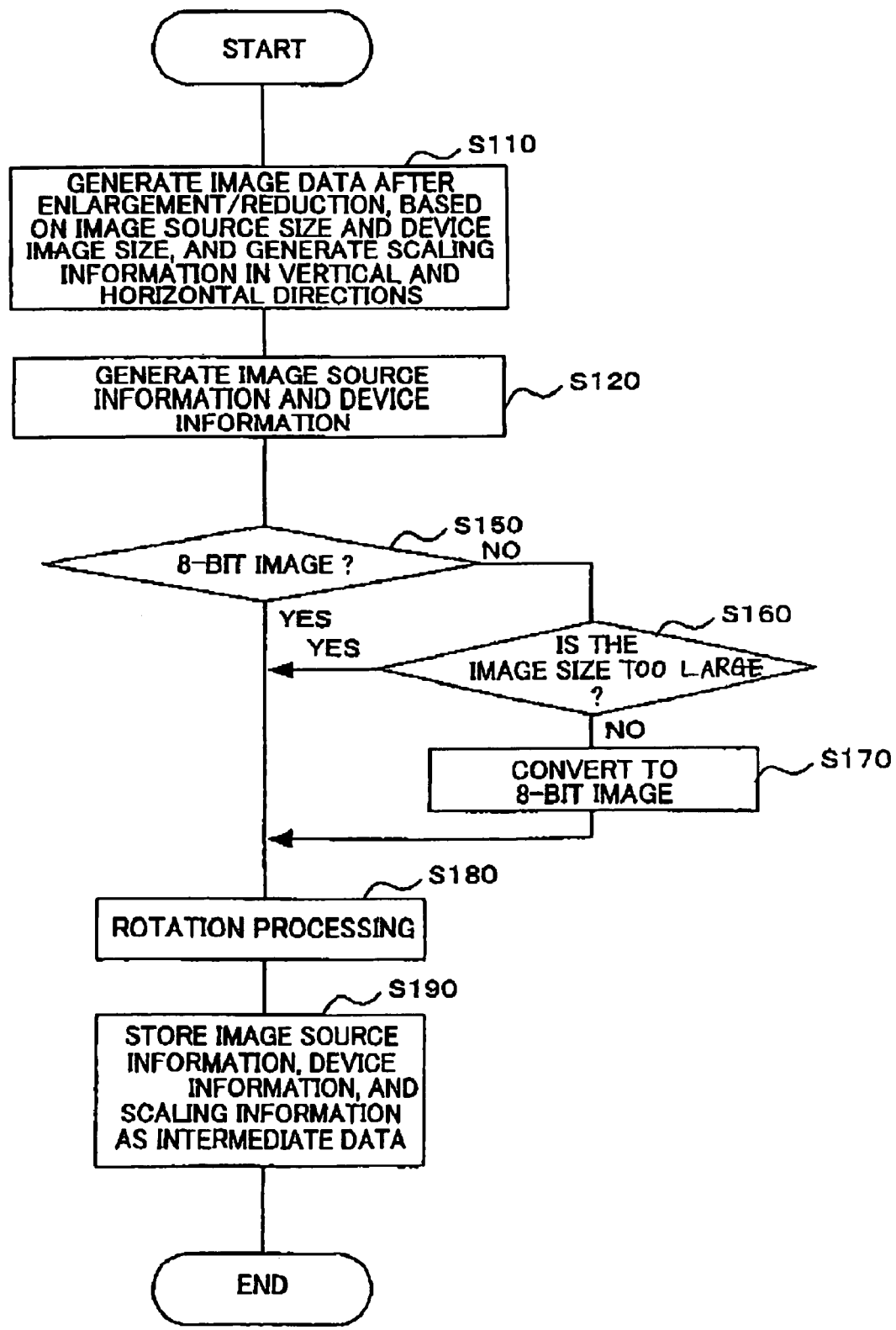
FIG. 4 is a flowchart showing the steps of intermediate data generation processing by the interpreter portion.

FIG. 4 is a flowchart of intermediate data generation processing by the interpreter portion 20. Note that the processing of FIG. 4 shows an example that does not include clip processing to be described later.

In S110, the interpreter portion 20 analyzes the PDL data that has been inputted from the host computer 2, and generates enlargement/reduction image data based on an image source size and a device image size included in the PDL data. Note that the image source size is a size of an image source, and the device image size is a size of a device image. The interpreter portion 20 also generates scaling information in the vertical direction and horizontal direction.

When the PDL data shown in FIG. 5(a) is inputted, for example, the interpreter portion 20 analyses the PDL data and recognizes that the color specification is RGB, a direct image (direct color), with 24-bit color (8 bits for each of the RGB colors). The interpreter portion 20 also recognizes that the image source size is 100 pixels wide and 50 pixels high and that the device image size is 500 dots wide and 300 dots high.

The interpreter portion 20 then calculates and obtains the scaling information that specifies scaling (enlargement ratio) from the image source to the device image. The rasterize portion 30 uses the scaling information to enlarge the intermediate image data. The scaling information is array information of the number of pixels in the row direction and the number of pixels in the column direction in a pixel matrix. In an example of FIG. 6(a), 50 pixels in the heightwise direction (vertical direction) must be expanded to 300 dots. In this case, a scaling factor is obtained as 300/50=6. Thus, each pixel is expanded to exactly six dots in the vertical direction.

Figure 6A:
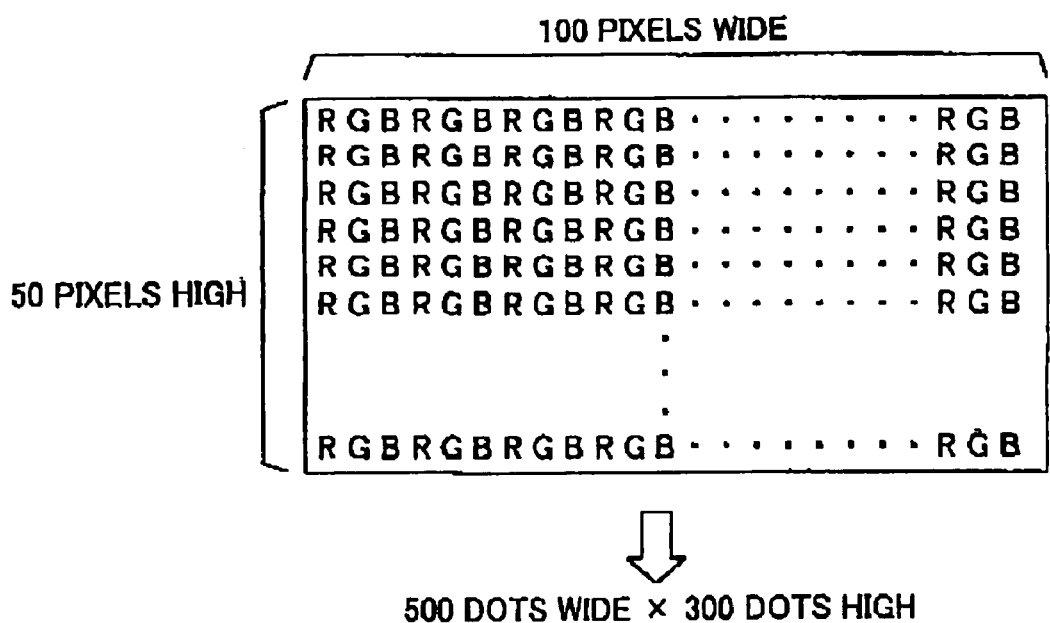
FIG. 6(a) is an explanatory diagram of image data of an image source.
Figure 6B:
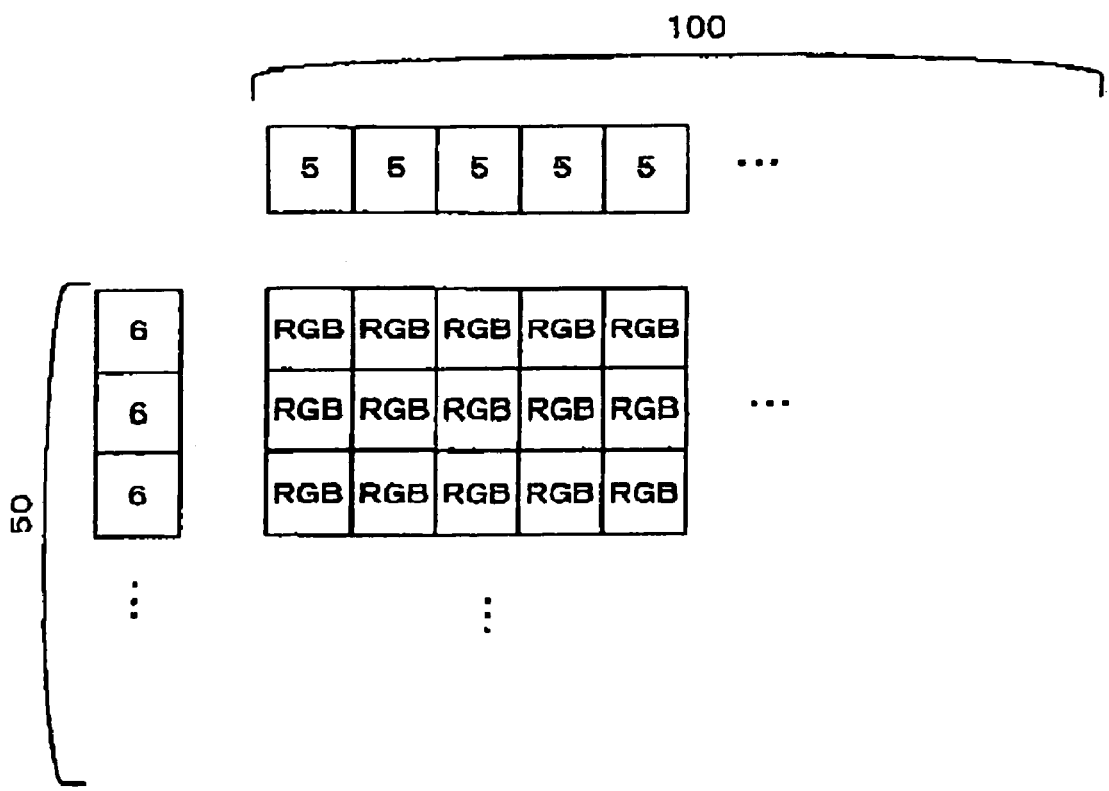
FIG. 6(b) is an explanatory diagram showing expansion of the image source in accordance with scaling data.

As shown in FIG. 6(b), a vertical-direction expansion multiplier array is obtained as [50]={6, 6, 6, 6, 6, ..., 6}. Similarly, 100 pixels in the widthwise direction (horizontal direction) must be expanded to 500 dots. In this case, the scaling factor is obtained as 500/100=5. Thus, each pixel is expanded to exactly five dots in the horizontal direction. A horizontal-direction expansion multiplier array is therefore obtained as [100]={5, 5, 5, 5, 5, ..., 5}.

As shown in the example of FIGS. 6(a) and 6(b), if the scaling factors in both of the vertical and horizontal directions are greater than 1, the CPU 21 stores the image data of the PDL data as is into the RAM 23 as the intermediate image data. Note that if the image data in the PDL data are compressed data, the CPU 21 decompresses the compressed data and stores the decompressed image data in the RAM 23.

Since the scaling factors in both the vertical and horizontal directions of this example are exactly divisible numbers (integers), the expansion multiplier arrays in both the vertical and horizontal directions are also integers as described above. Therefore, these integers can be used as is. If the scaling factor is not an integer, on the other hand, the expansion numbers for the pixels can be obtained as described below.

A method for obtaining the expansion multiplier array is described with reference to FIGS. 7(a) and 7(b). FIG. 7(a) shows a general procedure to obtain the expansion multiplier array when expanding an image source size S to a device image size D. A basic idea of this method is to find how many S can be contained in D. In line 1, the device image size D is assigned to a value DOTVALUE. A value Sn is 0. In line 2, the image source size S is subtracted from DOTVALUE. Assume DOTVALUE is still greater than S. The value Sn remains 0. In line 3, S is further subtracted from DOTVALUE. Assume DOTVALUE has become smaller than S after the subtraction. In this case, D is added to DOTVALUE and the value Sn is incremented from 0 to 1. In lines after line 3, the same calculation is performed.

A specific example of the above method is explained with reference to FIG. 7(b). In this example, an horizontal-direction expansion multiplier array is obtained when expanding a horizontal size 37 of the image source to a horizontal size 80 of the device image. In line 1, the horizontal size 80 of the device image is assigned to DOTVALUE. In line 2, the horizontal size 37 of the image source is subtracted from DOTVALUE (80−37=43). DOTVALUE (=43) is still greater than 37. The value Sn remains 0. In line 3, 37 is further subtracted from DOTVALUE (43−37=6). Because DOTVALUE (=6) has become smaller than 37, 80 is added to DOTVALUE (6+80=86) and the value Sn is incremented from 0 to 1. In line 4, 37 is subtracted from DOTVALUE (86−37=49). DOTVALUE (=49) is still greater than 37. The value Sn remains 1. In line 5, 37 is further subtracted from DOTVALUE (49−37=12). Because DOTVALUE (=12) has become smaller than 37, 80 is added to DOTVALUE (12+80=92) and the value Sn is incremented from 1 to 2. The same procedure is repeated until the value Dn becomes 79 (the horizontal size of the device image 80 minus 1). As a result of this procedure, the values Sn and Dn are obtained as shown in FIG. 7(b), although FIG. 7(b) only shows the first 19 lines. The CPU 21 counts the numbers of each Sn with regard to Dn. That is, the CPU 21 counts how many 0s, how many 1s, how may 2s, and the like exist. In this example, the values Sn are 0, 0, 1, 1, 2, 2, 3, 3, 4, 4, 5, 5, 6, 6, 6, 7, 7, 8, 8 . . . , where there are two 0s, two is, two 2s , . . . , and so on. Accordingly, the CPU 21 obtains the horizontal-direction expansion multiplier array as [37]={2, 2, 2, 2, 2, 2, 3, 2, 2, . . . }.

In another example, the image source size obtained by the PDL data is 500 pixels wide and 300 pixels high and that the device size is 700 dots wide and 800 dots high. In this case, the vertical-direction expansion multiplier array can be obtained as [300]={2, 3, 2, 3, 3, 2, 3, . . . } and the horizontal-direction expansion multiplier array can be obtained as [500]={1, 1, 2, 1, 1, 2, 1, 2, 1, 1, . . . }.

In some cases, at least one of the scaling factors in the vertical and horizontal directions is smaller than 1. In other words, the device image size is smaller than the image source size. In that case, the interpreter portion 20 performs reduction processing on the image data in the PDL data so that it fits into the device image size specified by the PDL data (FIG. 5), and stores image data of the reduced size in the RAM 23. Note that if the image data in the PDL data is compressed data, the CPU 21 decompresses the compressed image data and performs the reduction processing on the decompressed image data.

The interpreter portion 20 performs the calculations to obtain the above-described scaling information after the reduction processing. If the scaling factor in the vertical direction is less than 1, all the elements of the vertical-direction expansion multiplier array are 1. Similarly, if the scaling factor in the horizontal direction is less than 1, all the elements of the horizontal-direction expansion multiplier array are 1. Note that, if one of the scaling factors in either the vertical or the horizontal direction is greater than 1, the scaling information is obtained, for the direction, by the scaling information processing for enlargement described above.

If the image source size obtained from the PDL data is 800 pixels wide and 700 pixels high and the device image size is 500 dots wide and 300 dots high, the scaling factors in both the horizontal and vertical directions are leas than 1. Thus, the interpreter portion 20 reduces the image data in the PDL data into the device image size 500 dots wide and 300 dots high) and stores the reduced image data in the RAM 23. The interpreter portion 20 generates, as scaling information, a vertical-direction expansion multiplier array [300]={1, 1, 1, 1, . . . , 1} and a horizontal-direction expansion multiplier array [500]={1, 1, 1, 1, . . . , 1}.

In S120 (FIG. 4), the interpreter portion 20 generates the image source information and device information in FIG. 3, based on the PDL data. Taking the PDL data of FIG. 5(a) as an example, the interpreter portion 20 stores, in the RAM 23, the bit depth of 8 bits, the color specification of RGB, and the vertical and horizontal sizes of image source of 100 and 50.

The interpreter portion 20 also stores, in the RAM 23, the device image position (600, 400), the device image size width (500 dots) and the device image size height (300 dots) in FIG. 5(a). These values correspond to the position at the device, the width at the device, and the height at the device, respectively, all of which are included in the device information (see FIG. 3).

In S150, the interpreter portion 20 determines whether or not the image data in the PDL data (image data of the image source) is 8-bit data. If the image data is 8-bit data (S150: YES), the CPU 21 advances to S180; if the image data is not 8-bit data (S150; NO), the CPU 21 moves on to S160.

In S160, the interpreter portion 20 determines whether or not the image size is excessively large. In other words, the interpreter portion 20 determines whether or not the image size is greater than or equal to a predetermined value (such as 100 pixels high by 100 pixels wide). If the image size is greater than or equal to the predetermined value (S160: YES), the CPU 21 moves on to S180; if the image size is less than the predetermined value (S160: NO), the CPU 21 advances to S170.

In S170, the interpreter portion 20 converts each pixel of the post-enlargement/reduction image data into 8-bit format. The interpreter portion 20 also converts the value of the bit depth on the image source information (FIG. 3) created in S120 to 8-bit.

Thus, because of the processing of S160 through S180, the printer 1 can restrain the size of the image data used as intermediate data (intermediate image data) by not converting the pixel format to 8-bit if the image size is greater than or equal to the predetermined value.

If the PDL data includes data instructing rotation processing, such as a 90-degree, 180-degree, or 270-degree rotation, the CPU 21 performs rotation processing on the post-enlargement/reduction image data in S180.

In S190, the CPU 21 stores the image source information (including the intermediate image data), the device information, and the scaling information that are created in S110 through S180 in the RAM 23, as intermediate data having the data structure shown in FIG. 3.

Figure 2:
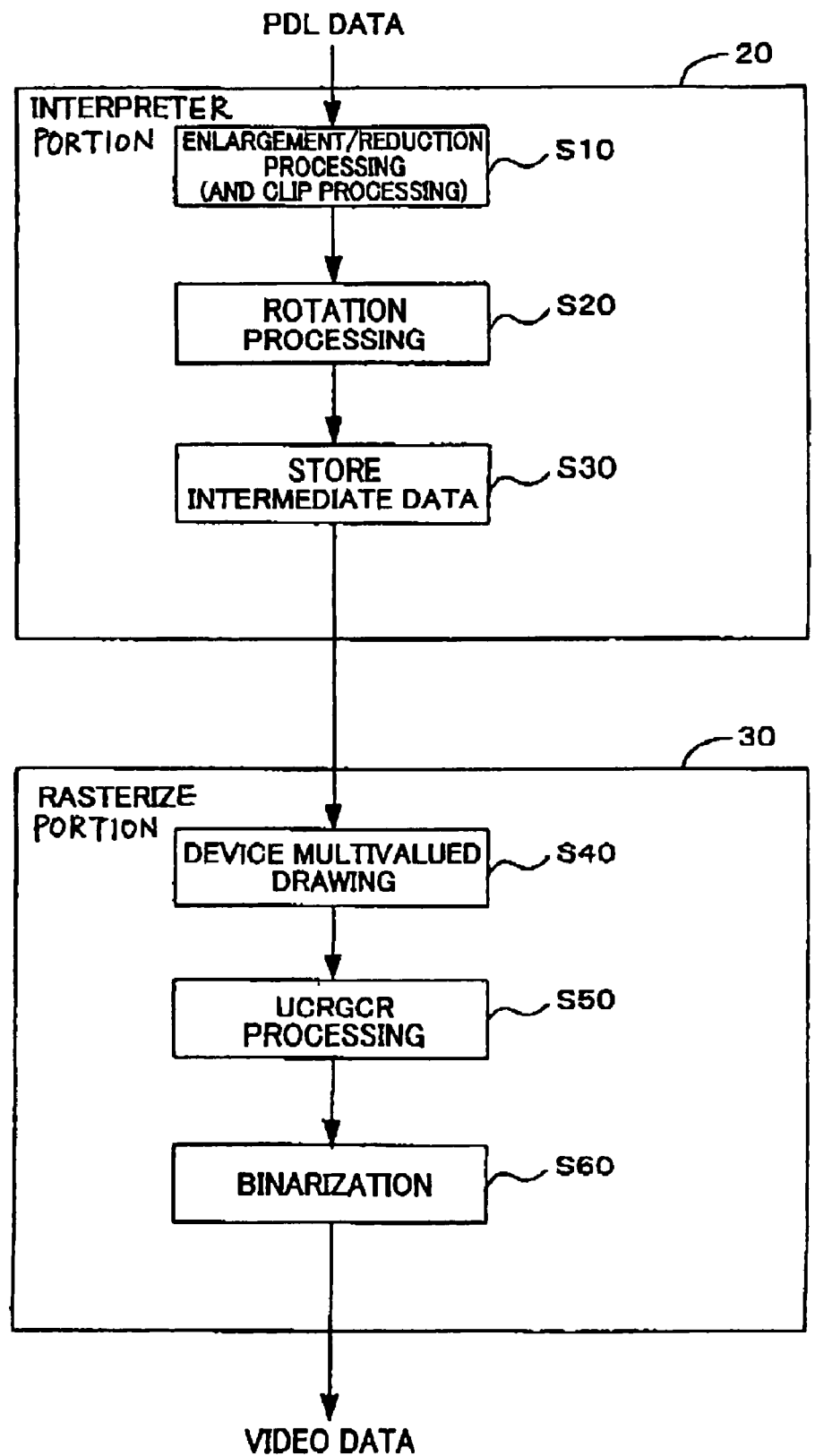
FIG. 2 is an explanatory diagram showing the steps performed by an interpreter portion and a rasterize portion.

In S40 shown in FIG. 2, the rasterize portion 30 acquires intermediate data from the RAM 23 of the interpreter portion 20 through the I/O 24. Then, the rasterize portion 30 stores device multivalue page data based on the intermediate data into the drawing memory 32. The rasterize portion 30 performs this storing (drawing) processing based on the information in the intermediate data shown in FIG. 3. The rasterize portion 30 references the bit depth, and if the bit depth is 1-bit, 2-bits, or 4-bits, the rasterize portion 30 stores or draws the image data in the drawing memory 32 while converting the image data into 8-bit format. The rasterize portion 30 also references the scaling information and performs the storing (drawing) processing while expanding each pixel, based on an expansion multiplier number in the vertical-direction expansion multiplier array corresponding to that pixel and the expansion multiplier number in the horizontal-direction expansion multiplier array corresponding to that pixel. In an example shown in FIG. 6(b), for example, the rasterize portion 30 expands each pixel into data for 5 dots in the horizontal direction and 6 dots in the vertical direction.

As described above, the page data in the drawing memory 32 is subjected to UCRGCR (under color removal and gray component replacement) processing to adjust the black level thereof (S50). The page data is subsequently binarized through half-tone processing according to well-known dither method (S60). Then, the rasterize portion 30 outputs video data to the print engine 40 based on the processed data. The print engine 40 receives the video data that is outputted from the rasterize portion 30 and prints the video data on paper.

As described above, if enlargement is required, the printer 1 uses the image data before the enlargement processing as the intermediate data; and if reduction is required, the printer 1 uses the image data after the reduction processing as the intermediate data. This enables the printer 1 to reduce the amount of memory (the RAM 23) used for storing the intermediate data. In other words, it makes it possible to restrain any inflation of the intermediate data and suppress pressure on the memory.

Note that processing in S150 through S170 in FIG. 4 ensure that the interpreter portion 20 converts the image data into 8-bit data if the image size is less than the predetermined value. However, as shown in FIG. 5(b), if the PDL data supports a format given in index values for a color palette, and the size of the image data is less than the predetermined value, the interpreter portion 20 can perform conversion of the pixel format into color data (direct colors). When the interpreter portion 20 has performed conversion into color data, the value of the color specification of the image source information (FIG. 3) created in S120 will be changed from "palette" to "RGB".

If the color specification is other than "RGB" in such a case, the rasterize portion 30 stores the intermediate image data into the drawing memory 32 while converting the pixel format into "RGB". Hence, the printer 1 can minimize the intermediate data and thus suppress any pressure on the memory (the RAM 23). As shown in the example in FIG. 5(b), since direct image (RGB) data is 24 bits (8 bits for each of the RGB colors) in contrast to the 8-bit palette data, storing the 8-bit palette data as intermediate data requires only one-third of the volume of the drawing memory 32.

If the PDL data supports a function called a clip command, the interpreter portion 20 can also perform clip processing in the processing of S110 in FIG. 4.

The interpreter portion 20 performs the clip processing when the host computer 2 has sent the clip command shown in FIG. 5(c) together with the PDL data of FIG. 5(a).

In S110, the CPU 21 calculates a corresponding relationship from the PDL data of FIGS. 5(a) and 5(c). FIGS. 8(a) through 8(d) show how the interpreter portion 20 performs the clip processing. FIG. 8(a) shows an image source S having an image source size of 100 pixels wide by 50 pixels high (FIG. 5(a)) which will be enlarged by the interpreter portion 20.

As shown in FIG. 8(b), the interpreter portion 20 enlarges the image source S in the area of a device image size (500 dots wide by 300 dots high) at the position of the device image (FIG. 5(a)) that starts at a point C(600, 400) within a device page area that is equivalent to the paper. The interpreter portion 20 obtains a drawing area R1 (the shaded portion in FIG. 8(b)) that is positioned inside a clip rectangle. The clip rectangle is defined by a diagonal line between a point A(800, 300) and a point B(1300, 550) that is specified by the clip command in FIG. 5(c). As shown in FIG. 8(b), the drawing area R1 is inside a rectangle defined by a diagonal line between a point D(800, 400) and a point E(1100, 550) in the device page area.

As shown in FIG. 8(c), the interpreter portion 20 obtains a corresponding image source area R2 of the image source S that corresponds to the drawing area R1. The corresponding image source area R2 is an area of the shaded portion in FIG. 8(c) that is inside a rectangle defined by a diagonal line between a point F(40, 0) and a point G(100, 25). Then, the interpreter portion 20 cuts out or clips only the corresponding image source area R2 and obtains the image source after clipping that is shown in FIG. 8(d).

Figure 9:
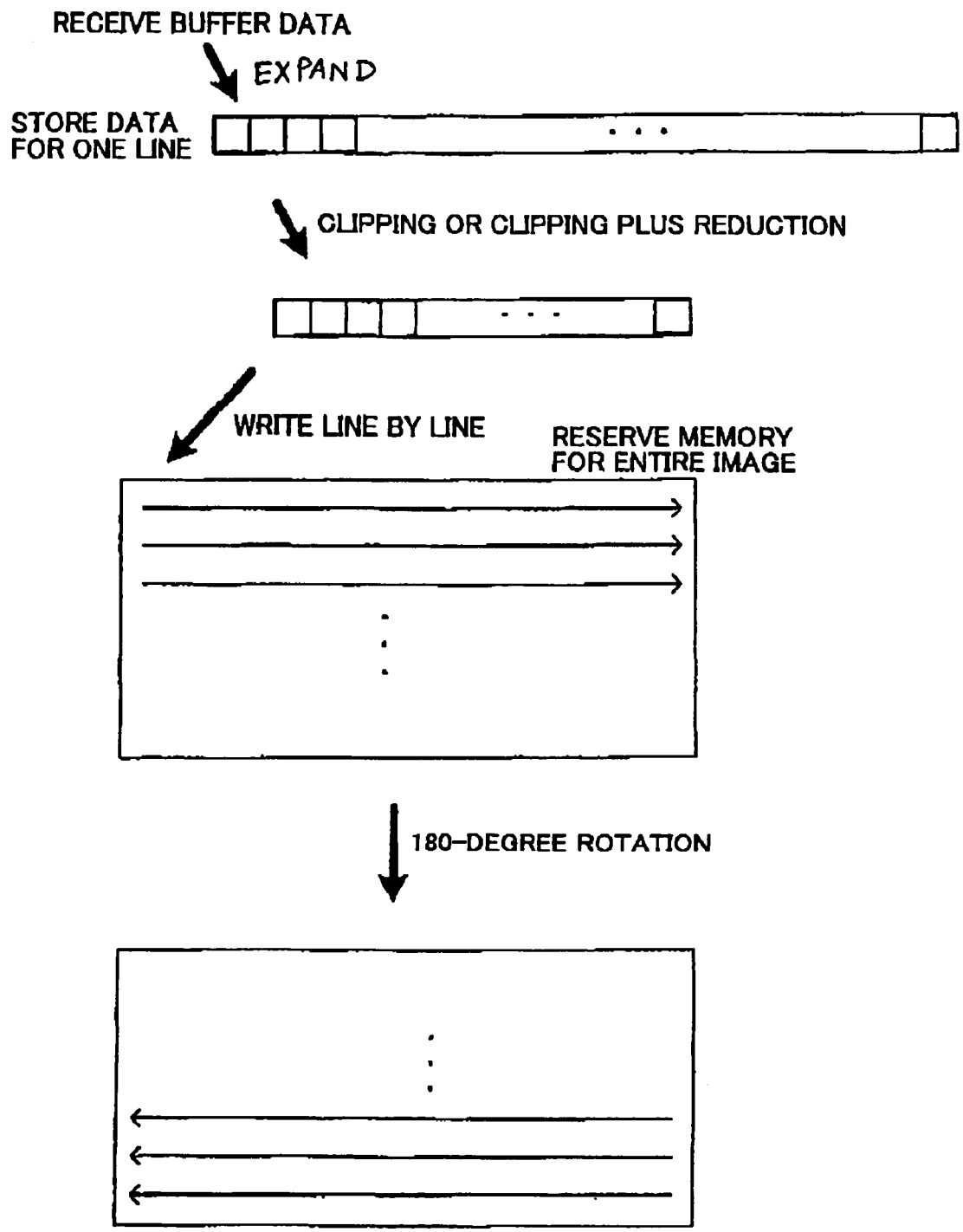
FIG. 9 is an explanatory diagram showing a specific method of the clip processing.

As shown in FIG. 9, the CPU 21 expands one line of data in the horizontal direction from a receive buffer for the PDL data that is provided in the RAM 23. The CPU 21 clips only data for horizontal positions within the area R2 (the shaded portion) from a line in the image source S. Then, the CPU 21 writes the data for the clipped portion to the RAM 23. The CPU 21 generates the image data for the clipped portion by repeating this processing one line at a time.

The CPU 21 then performs the previously described enlargement/reduction processing on the clipped image data, to obtain post-enlargement/reduction image data (intermediate image data). Note that if reduction is to be performed, the interpreter portion 20 performs the reduction during the clip processing. Since the clip processing throws away the image data that is not used for actual printing, only the necessary portions are generated as intermediate image data. It is therefore possible to further reduce the volume of intermediate data, enabling a further suppression of pressure on the memory.

Figure 10A:
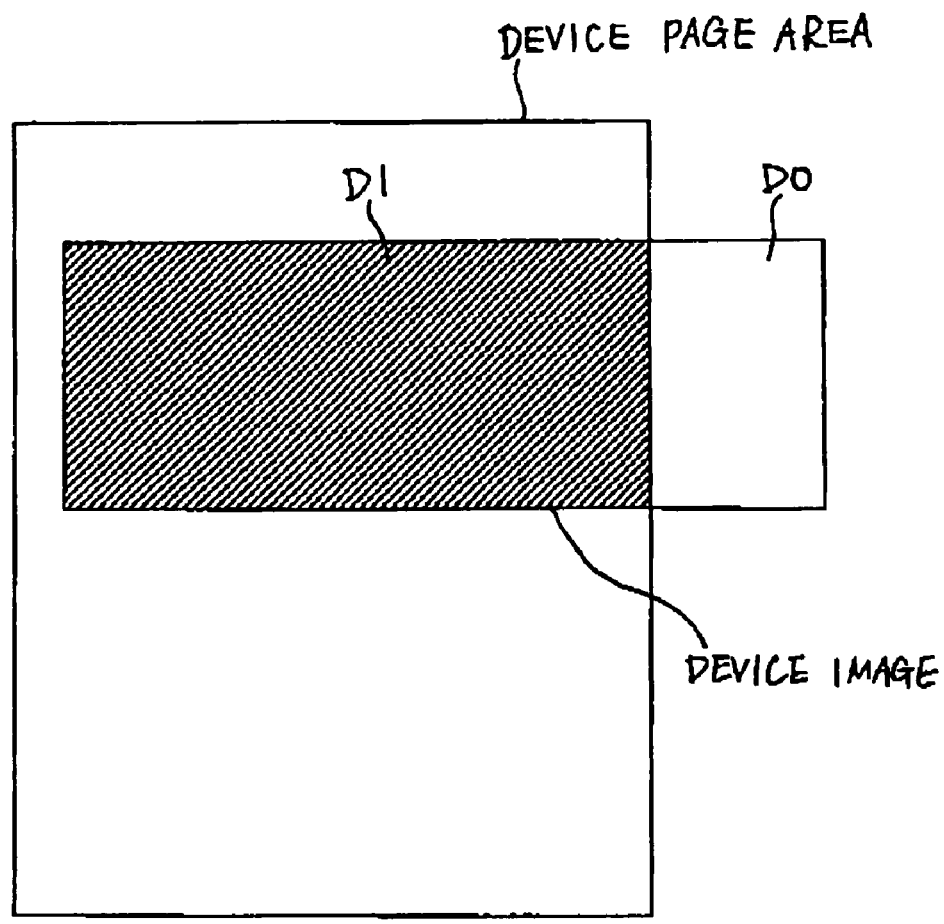
FIG. 10(a) is an explanatory diagram showing a device image and a device page area in which an inside area of the device image is shown as a shaded area.
Figure 10B:
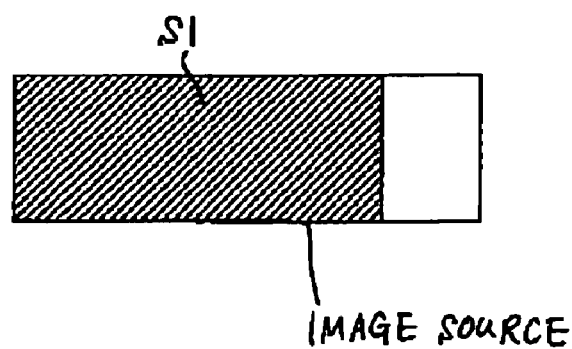
FIG. 10(b) is an explanatory diagram showing an inside area (shaded area) of the image source that corresponds to the inside area of the device image.

The interpreter portion 20 can also perform a processing that is similar to the clip processing described above. In an example shown in FIG. 10(a), a device image does not fit in the device page area and includes an outside area D0 that is outside the device page area. In such a case, as shown in FIG. 10(b), the CPU 21 finds an inside area S1 of the image source that corresponds to an inside area D1 of the device image. Then, the interpreter portion 20 generates the intermediate data including image data of the inside area S1 of the image source. Other than that, the interpreter portion 20 performs processing similar to the clip processing described above.

According to the printer 1 of the present embodiment as described above, because the rasterize portion 30 need not calculate whether each pixel of the image source is to be expanded to some dots of the device image, the configuration of the rasterize portion 30 can be simplified.

The printer 1 uses the image data of the image source itself as the intermediate image data when enlargement is required from the image source size to the device image size. Further, the interpreter portion 20 converts the pixel format to the format that is required by the rasterize portion 30, only when the image source size is smaller than a predetermined size. Accordingly, there is no problem that the size of the intermediate data becomes too large.

While the invention has been described in detail with reference to the specific embodiment thereof, it would be apparent to those skilled in the art that various changes and modifications may be made therein without departing from the spirit of the invention.

What is claimed is:
1. An image data processing device comprising:
an interpreter portion obtaining page description language data that includes image data of a source image and image-size specifying data of both the source image and a device image, the interpreter portion generating intermediate data based on the image data of the source image and the image-size specifying data; and a rasterize portion generating image data of the device image in an output memory based on the intermediate data, wherein, if the image-size specifying data specifies enlargement from the size of the source image to the size of the device image, the interpreter portion generates the intermediate data that includes intermediate image data and enlargement ratio data, the intermediate image data being the same data as the image data of the source image, the enlargement ratio data specifying enlargement ratios from the size of the source image to the size of the device image.

2. The image data processing device as claimed in claim 1, wherein, if the image-size specifying data specifies reduction from the size of the source image to the size of the device image, the interpreter portion reduces the size of the source image to the size of the device image based on the image-size specifying data and generates the intermediate data that includes the intermediate image data and the enlargement ratio data, the intermediate image data being the image data of the reduced size source image, the enlargement ratio data specifying enlargement ratios maintaining the size of the reduced size source image.

3. The image data processing device as claimed in claim 2, wherein, if the page description language data includes clip specifying data that specifies clipping of a specified portion of the device image, the interpreter portion generates the intermediate data including the image data of a corresponding portion of the source image, the corresponding portion of the source image corresponding to the specified portion of the device image.

4. The image data processing device as claimed in claim 2, wherein the source image includes multiple pixels that are arranged in a form of a matrix hating rows and columns;

wherein the intermediate image data includes image data of multiple pixels that are arranged in a form of a matrix having rows and columns;

wherein the interpreter portion generates the intermediate data that includes the enlargement ratio data based on the image-size specifying data of both the source image and the device image, the enlargement ratio data including an expansion multiplier for each row and an expansion multiplier for each column; and wherein the rasterize portion expands each pixel of the intermediate image data based on the expansion multiplier for each row and the expansion multiplier for each column, thereby generating the image data of the device image.

5. The image data processing device as claimed in claim 2, wherein the interpreter portion includes a determination portion determining whether to convert a pixel format when generating the intermediate image data from the image data of the source image;

wherein, if the determination portion has determined that the pixel format is to be converted to a predetermined format that is required by the rasterize portion, the interpreter portion converts the pixel format to the predetermined format and changes the intermediate data to include pixel-format instruction data instructing the rasterize portion that the conversion of the pixel format has already been performed;

wherein, if the determination portion has determined that the pixel format is not to be converted, the interpreter portion changes the intermediate data to include the pixel-format instruction data instructing the rasterize portion to convert the pixel format to the predetermined format; and wherein the rasterize portion converts the pixel format of the intermediate image data to the predetermined format depending on the instruction of the pixel-format instruction data, thereby generating the image data of the device image in the predetermined format.

6. The image data processing device as claimed in claim 1, wherein, if the page description language data includes clip specifying data that specifies clipping of a specified portion of the device image, the interpreter portion generates the intermediate data including the image data of a corresponding portion of the source image, the corresponding portion of the source image corresponding to the specified portion of the device image.

7. The image data processing device as claimed in claim 1, wherein, if the device image includes both an inside portion that is inside a device page area and an outside portion that is outside the device page area, the interpreter portion generates the intermediate data including image data of an inside portion of the source image, the inside portion of the source image corresponding to the inside portion of the device image.

8. The image data processing device as claimed in claim 1, wherein the source.image includes multiple pixels that are arranged in a form of a matrix having rows and columns;

wherein the intermediate image data includes image data of multiple pixels that are arranged in a form of a matrix having rows and columns;

wherein the interpreter portion generates the intermediate data that includes the enlargement ratio data based on the image-size specifying data of both the source image and the device image, the enlargement ratio data including an expansion multiplier for each row and an expansion multiplier for each column; and wherein the rasterize portion expands each pixel of the intermediate image data based on the expansion multiplier for each row and the expansion multiplier for each column, thereby generating the image data of the device image.

9. The image data processing device as claimed in claim 1, wherein the interpreter portion includes a determination portion determining whether to convert a pixel format when generating the intermediate image data from the image data of the source image;

wherein, if the determination portion has determined that the pixel format is to be converted to a predetermined format that is required by the rasterize portion, the interpreter portion converts the pixel format to the predetermined format and changes the intermediate data to include pixel-format instruction data instructing the rasterize portion that the conversion of the pixel format has already been performed;

wherein, if the determination portion has determined that the pixel format is not to be converted, the interpreter portion changes the intermediate data to include the pixel-format instruction data instructing the rasterize portion to convert the pixel format to the predetermined format; and wherein the rasterize portion converts the pixel format of the intermediate image data to the predetermined format depending on the instruction of the pixel-format instruction data, thereby generating the image data of the device image in the predetermined format.

10. The image data processing device as claimed in claim 9, wherein the conversion of the pixel format represents conversion of a number of bits for representing pixels to a predetermined number of bits.

11. The image data processing device as claimed in claim 9, wherein the conversion of the pixel format represents conversion from index values of a color palette to corresponding data for direct color.

12. The image data processing device as claimed in claim 9, wherein the determination portion determines whether to perform the conversion of the pixel format, depending on whether the size of the source image is greater than or equal to a predetermined size.

13. The image data processing device as claimed in claim 9, wherein the interpreter portion further includes a memory for storing the intermediate data; and wherein the determination portion determines whether to perform the conversion of the pixel format depending on a free amount of the memory.

14. An image forming apparatus comprising:

an image data processing device including:

an interpreter portion obtaining page description language data that includes image data of a source image and image-size specifying data of both the source image and a device image, the interpreter portion generating intermediate data based on the image data of the source image and the image-size specifying data; and a rasterize portion generating image data of the device image in an output memory based on the intermediate data, wherein, if the image-size specifying data specifies enlargement from the size of the source image to the size of the device image, the interpreter portion generates the intermediate data that includes intermediate image data and enlargement ratio data, the intermediate image data being the same data as the image data of the source image, the enlargement ratio data specifying enlargement ratios from the size of the source image to the size of the device image; and a printing device printing, on a medium, the device image in accordance with the image data of the device image.

15. The image forming apparatus as claimed in claim 14, wherein, if the image-size specifying data specifies reduction from the size of the source image to the size of the device image, the interpreter portion reduces the size of the source image to the size of the device image based on the image-size specifying data and generates the intermediate data that includes the intermediate image data and the enlargement ratio data, the intermediate image data being the image data of the reduced size source image, the enlargement ratio data specifying enlargement ratios maintaining the size of the reduced size source image.

* * * * *